United States Patent
Ikeda

(10) Patent No.: US 9,878,759 B2
(45) Date of Patent: Jan. 30, 2018

(54) SHOCK ABSORBER

(71) Applicant: Showa Corporation, Gyoda-shi (JP)

(72) Inventor: Daisuke Ikeda, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 15/051,019

(22) Filed: Feb. 23, 2016

(65) Prior Publication Data

US 2016/0244121 A1 Aug. 25, 2016

(30) Foreign Application Priority Data

Feb. 25, 2015 (JP) .................................. 2015-035180

(51) Int. Cl.
| | |
|---|---|
| F16F 9/36 | (2006.01) |
| B62K 25/08 | (2006.01) |
| F16F 9/06 | (2006.01) |
| F16F 9/18 | (2006.01) |
| F16D 57/00 | (2006.01) |

(52) U.S. Cl.
CPC ............. B62K 25/08 (2013.01); F16F 9/06 (2013.01); F16F 9/062 (2013.01); F16F 9/18 (2013.01); F16F 9/362 (2013.01)

(58) Field of Classification Search
CPC ...... F16F 9/06; F16F 9/062; F16F 9/18; F16F 9/362; B62K 25/08
See application file for complete search history.

(56) References Cited

U.S. PATENT DOCUMENTS

| | | | | |
|---|---|---|---|---|
| 2,404,111 | A | * 7/1946 | Underwood | ............ B64C 25/60 267/64.15 |
| 3,439,499 | A | * 4/1969 | Stratford | ................... F16F 9/18 188/269 |
| 4,729,529 | A | * 3/1988 | Hrusch | ................... B64C 25/60 188/285 |
| 2010/0207350 | A1* | 8/2010 | Uchiyama | .............. B62K 25/08 280/276 |
| 2011/0100950 | A1* | 5/2011 | Graux | ................. B29C 45/2622 215/355 |
| 2014/0210146 | A1 | 7/2014 | Aoki | |

FOREIGN PATENT DOCUMENTS

| | | |
|---|---|---|
| EP | 2740964 A | 6/2014 |
| JP | 2013-228089 A | 11/2013 |

OTHER PUBLICATIONS

Extended European Search Report dated Oct. 18, 2016 for the corresponding European Patent Application No. 16157281.3.

* cited by examiner

*Primary Examiner* — Melody M Burch
(74) *Attorney, Agent, or Firm* — Leason Ellis LLP

(57) ABSTRACT

Disclosed is a shock absorber that includes first to third gas spring chambers, and performs a compression operation and an extension operation. The shock absorber includes a lip packing which works as a rod lip packing for the third gas spring chamber and has an arc-shaped lip, a lip packing which works as a piston lip packing for the third gas spring chamber and has the arc-shaped lip, a lip packing which works as a piston lip packing for the first gas spring chamber and has an edge-shaped lip, and a lip packing which works as a rod lip packing for the second gas spring chamber and has the edge shaped lip.

15 Claims, 6 Drawing Sheets

FIG. 7      *Related Art*
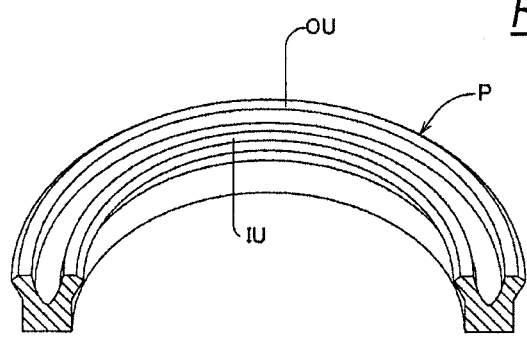
FIG. 8      *Related Art*
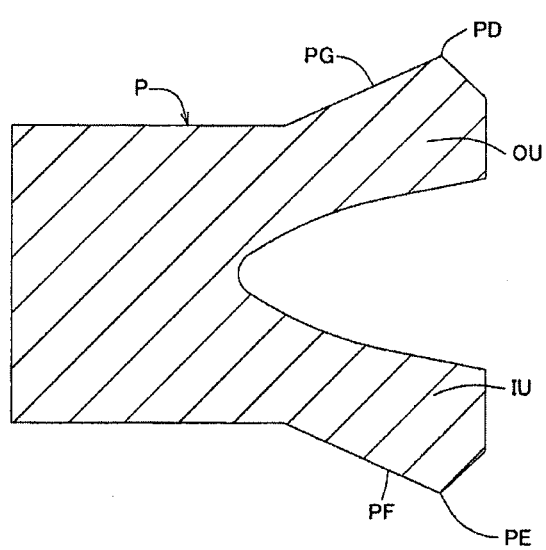
FIG. 9      *Related Art*
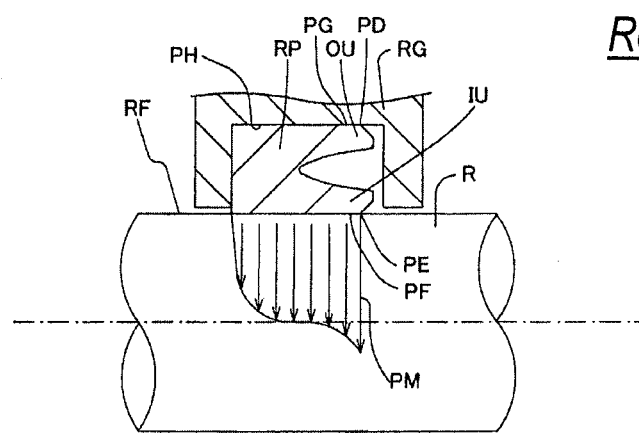

SHOCK ABSORBER

CROSS-REFERENCE TO RELATED APPLICATIONS

This application is based on and claims priority under 35 USC 119 from Japanese Patent Application No. 2015-035180 filed on Feb. 25, 2015, the entire content of which is incorporated herein by reference.

BACKGROUND

1. Technical Field

The present invention relates to a gas spring shock absorber.

2. Related Art

Disclosed is a shock absorber which is configured such that a first end of a circular cylindrical inner tube is fixed to a first end fixation portion in a sealed manner, a second end of a circular cylindrical outer tube is fixed to a second end fixation portion in a sealed manner, a second end of the inner tube is inserted into the outer tube via a first end opening of the circular cylindrical outer tube, the inner tube and the outer tube can move relative to each other along the center axis thereof in a state where air-tight sealing between an outer circumferential surface of the inner tube and an inner circumferential surface of the outer tube is formed, a circular cylinder and a circular cylindrical rod are provided inside of the outer tube and the inner tube, a first end of the rod is fixed to the first end fixation portion in such a way that a first end opening of the rod is sealed, a second end of the cylinder is fixed to the second end fixation portion in such a way that a second end opening of the cylinder is sealed, a second end of the rod is inserted into the cylinder via a rod through hole of a rod guide provided at a first end opening of the cylinder, and a piston is provided on a second end portion of the rod which is inserted into the cylinder (for example, refer to JP-A-2013-228089 and the like).

The interior of the shock absorber is divided into three chambers: an inner chamber as a first gas spring chamber that is formed as a sealed space surrounded by the piston, the second end fixation portion, and an inner circumferential surface of the cylinder between the piston and the second end fixation portion; an outer chamber as a second gas spring chamber that is formed as a sealed space surrounded by an outer circumferential surface of the rod, the first end fixation portion, the inner circumferential surfaces of the inner tube and the outer tube, the second end fixation portion, and an outer circumferential surface of the cylinder; and a balance chamber as a third gas spring chamber that is formed as a sealed space surrounded by the piston, the rod guide, and the inner circumferential surface of the cylinder between the piston and the rod guide.

This shock absorber includes a piston lip packing which is provided so as to maintain air-tight sealing between an outer circumferential surface of the piston and the inner circumferential surface of the cylinder such that air-tight sealing between the balance chamber and the inner chamber that are adjacent to each other is maintained, and a rod lip packing which is provided so as to maintain air-tight sealing between the rod through hole of the rod guide and the outer circumferential surface of the rod such that air-tight sealing between the balance chamber and the outer chamber that are adjacent to each other is maintained.

In this shock absorber, in a compression operation in which the first end fixation portion and the second end fixation portion move in such a way as to approach each other, volumes of the inner chamber and the outer chamber are reduced, gas in the inner chamber and the outer chamber is compressed, and thus a gas spring is formed to generate a reaction force that biases the first end fixation portion and the second end fixation portion to move away from each other. In an extension operation in which the first end fixation portion and the second end fixation portion move in such a way as to move away from each other, since the piston and the guide rod move in such a way as to approach each other, a volume of the balance chamber is reduced, gas in the balance chamber is compressed, and thus a gas spring is formed to generate a reaction force that biases the first end fixation portion and the second end fixation portion to approach each other.

The entirety of each of the rod lip packing and the piston lip packing is formed in an annular shape, and respective sections are formed in a lip shape (or a U shape) as illustrated in FIGS. 7 and 8. For this reason, the rod lip packing and the piston lip packing are referred to as a lip packing (or U packing) P. A lip portion positioned on an inner circumference of an annulus of the lip packing P is referred to as an inner circumferential lip IU, and a lip portion positioned on an outer circumference of the annulus is referred to as an outer circumferential lip OU. An inner circumferential surface PF of the inner circumferential lip IU includes an apex portion that protrudes toward a center axis of the annulus, and an inner circumferential surface portion forming the apex portion constitutes a minimum-diameter inner circumferential edge PE, which is a line shape. An outer circumferential surface PG of the outer circumferential lip OU includes an apex portion that protrudes in a direction away from the center axis of the annulus, and an outer circumferential portion forming the apex portion constitutes a maximum-diameter outer circumferential edge PD, which is a line shape.

With regard to the rod lip packing, as illustrated in FIG. 9, a rod lip packing RP is mounted in a packing mounting groove PH provided on an inner circumferential surface of a rod guide RG, a rod R passes through an inner circumferential hole of an annulus of the rod lip packing RP, and an inner circumferential surface (a surface close to the center axis of the annulus) PF of an inner circumferential lip IU of the rod lip packing RP comes into contact with an outer circumferential surface RF of the rod R. An inner circumferential surface PF of an inner circumferential lip IU includes an apex portion that protrudes toward a center axis of an annulus, and the inner circumferential surface portion forming the apex portion constitutes a minimum-diameter inner circumferential edge PE, which is a line shape. That is, as illustrated in FIG. 8, a section of the minimum-diameter inner circumferential edge PE has an angled shape (edge shape).

Accordingly, as illustrated in FIG. 9, when fluid pressure is applied to a region between the inner circumferential lip IU and the outer circumferential lip OU of the rod lip packing RP mounted in the packing mounting groove PH of the rod guide RG, and thus the inner circumferential surface PF of the inner circumferential lip IU comes into contact with the outer circumferential surface RF of the rod R, a contact surface pressure PM between the minimum-diameter inner circumferential edge PE in an angled shape of the inner circumferential surface PF of the inner circumferential lip IU and the outer circumferential surface RF of the rod R is maximized, and thus sealing performance is maintained. Similarly, with regard to the piston lip packing, the piston lip packing is mounted in a packing mounting portion provided on an outer circumferential surface of the piston, an outer circumferential surface (a surface far from the center axis of the annulus) PG of the outer circumferential lip of the piston lip packing comes into contact with an inner circumferential surface of the cylinder. An outer circumferential surface PG of an outer circumferential lip OU includes an apex portion that protrudes in the direction away from the center axis of the annulus, and an outer circumferential portion forming the apex portion constitutes a maximum-diameter outer circumferential edge PD, which is a line shape. That is, as illustrated in FIG. 8, a section of the maximum-diameter outer circumferential edge PD has an angled shape (edge shape).

Accordingly, when the fluid pressure is applied to a region between the outer circumferential lip OU and the inner circumferential lip IU of the piston lip packing mounted in the packing mounting portion of the piston, and thus an outer circumferential surface PG of an outer circumferential lip OU comes into contact with the inner circumferential surface of the cylinder, a contact surface pressure between the maximum-diameter outer circumferential edge PD in an angle shape of the outer circumferential surface PG of the outer circumferential lip OU and the inner circumferential surface of the cylinder is maximized, and thus sealing performance is maintained. Note that compression ratio adjustment oil is sealed in the inner chamber and the outer chamber, and a small amount of oil for forming a sliding oil film is sealed in the balance chamber.

And, as the related art, please also see JP-A-2013-228089.

SUMMARY OF THE INVENTION

In the lip packings mentioned above, in order to prevent air leakage between the inner chamber and the balance chamber, air leakage between the outer chamber and the balance chamber, movement of the compression ratio adjustment oil from the inner chamber to the balance chamber, and movement of the compression ratio adjustment oil from the outer chamber to the balance chamber, the maximum-diameter outer circumferential edge of the outer circumferential surface of the outer circumferential lip in contact with the inner circumferential surface of the cylinder is formed in an edge shape, and the minimum-diameter inner circumferential edge of the inner circumferential surface of the inner circumferential lip in contact with the outer circumferential surface of the rod is formed in an edge shape. In addition, for reasons of structure of the lip packing, a self-sealing force is increased when pressure is increasingly applied.

That is, the contact surface pressure between the maximum-diameter outer circumferential edge of the outer circumferential lip of the piston lip packing and the inner circumferential surface of the cylinder is increased, the contact surface pressure between the minimum-diameter inner circumferential edge of the inner circumferential lip of the rod lip packing and the outer circumferential surface of the rod is increased, and shortage of oil film is likely to occur. Therefore, friction is increased during the compression operation and the extension operation of the shock absorber.

An object of the present invention is to provide a gas spring shock absorber with three chambers in which it is possible to reduce friction during extension and contraction of the shock absorber while preventing the movement of compression ratio adjustment oil among the three chambers, and it is possible to stabilize reaction force characteristics of a gas spring.

According to an aspect of the invention, there is provided a shock absorber includes: a cylindrical inner tube having a first end and a second end; a first end fixation portion to which the first end of the inner tube is fixed in such a way that a first end opening of the inner tube is sealed; a cylindrical outer tube having a first end and a second end where the second end of the inner tube is inserted into the outer tube via a first end opening of the outer tube, and the inner tube and the outer tube can move relative to each other in a state where air-tight sealing between an outer circumferential surface of the inner tube and an inner circumferential surface of the outer tube is formed; a second end fixation portion to which the second end of the outer tube is fixed in such a way that a second end opening of the outer tube is sealed; a rod disposed inside of the outer tube and the inner tube where one of a first end and a second end of the rod is fixed to the first end fixation portion or the second end fixation portion in such a way that one of a first end opening and a second end opening of the rod is sealed; a cylinder disposed inside of the outer tube and the inner tube where one of a first end and a second end of the cylinder is fixed to the second end fixation portion or the first end fixation portion in such a way that one of a first end opening and a second end opening of the cylinder is sealed; a rod guide provided on the other of the first end opening and the second end opening of the cylinder where the other of the first end and the second end of the rod is inserted into the cylinder via a rod-through hole of the rod guide; and a piston provided on the other of the first end and the second end of the rod which is inserted into the cylinder, in which when the first end fixation portion and the second end fixation portion move in such a way as to approach each other, or as to move away from each other, the piston and the rod guide can move in such a way as to as to move away from each other, or as to approach each other in a state where air-tight sealing between an outer circumferential surface of the piston, provided on the rod, and an inner circumferential surface of the cylinder is maintained, and air-tight sealing between an outer circumferential surface of the rod and an inner circumferential surface of the rod through hole of the rod guide is maintained, a first gas spring chamber, a second gas spring chamber and a third gas spring chamber are formed inside of the outer tube and the inner tube, the first gas spring chamber forms a space inside of the cylinder and between the piston and the first end fixation portion or the second end fixation portion which fixes the first end or the second end of the cylinder, the second gas spring chamber forms a space outside of the rod and inside of at least one of the inner tube and the outer tube, the third gas spring chamber forms a space inside of the cylinder and between the piston and the rod guide, an inside of the rod communicates with the third gas spring chamber while working as a gas chamber for adjusting an internal compression ratio of the third gas spring chamber, in a compression operation in which the first end fixation portion and the second end fixation portion move in such a way as to approach each other, volumes of the first gas spring chamber and the second gas spring chamber are reduced, and gas in the first gas spring chamber and the second gas spring chamber is compressed to form a gas spring generating a reaction force that biases the first end fixation portion and the second end fixation portion to move away from each other, in an extension operation in which the first end fixation portion and the second end fixation portion move in such a way as to move away from each other, since the piston and the guide rod move in such a way as to approach each other, a volume of the third gas spring chamber is reduced, and gas in the third gas spring chamber is compressed to form a gas spring generating a reaction force that biases the first end fixation portion and the second end fixation portion to approach each other, and the shock absorber further includes: a lip packing which works as a rod lip packing for the third gas spring chamber so that gas and oil in the third gas spring chamber can be prevented from leaking to the second gas spring chamber when being compressed during the extension operation where the lip packing has a lip, and a surface of the lip in contact with an outer circumferential surface of the rod is formed in an arc shape; a lip packing which works as a piston lip packing for the third gas spring chamber so that gas and oil in the third gas spring chamber can be prevented from leaking to the first gas spring chamber when being compressed during the extension operation where the lip packing has a lip, and a surface of the lip in contact with the inner circumferential surface of the cylinder is formed in an arc shape; a lip packing which works as a piston lip packing for the first gas spring chamber so that the gas and the oil in the first gas spring chamber can be prevented from leaking to the third gas spring chamber when being compressed during the compression operation where the lip packing has a lip, and a surface of the lip in contact with the inner circumferential surface of the cylinder is formed in an edge shape; and a lip packing which works as a rod lip packing for the second gas spring chamber so that the gas and the oil in the second gas spring chamber can be prevented from leaking to the third gas spring chamber when being compressed during the compression operation where the lip packing has a lip, and a surface of the lip in contact with the outer circumferential surface of the rod is formed in an edge shape. Therefore, it is possible to obtain the gas spring shock absorber that can reduce the friction during the compression operation and the extension operation, and stabilize reaction force characteristics of each of the gas spring chambers.

In another aspect, an arc-shaped surface of the lip of the lip packing may have a radial dimension of greater than 0.1 mm and less than 0.4 mm. Therefore, it is possible to obtain the gas spring shock absorber that can reduce the friction during the compression operation and the extension operation, and stabilize the reaction force characteristics of each of the gas spring chambers.

In a yet another aspect, the first end of the inner tube and the first end of the rod may be fixed to the first end fixation portion, and the second end of the outer tube and the second end of the cylinder may be fixed to the second end fixation portion. Therefore, in a so-called inverted shock absorber, it is possible to reduce the friction during the compression operation and the extension operation, and stabilize the reaction force characteristics of each of the gas spring chambers.

In a still another aspect, a gas chamber for adjusting the internal compression ratio of the third gas spring chamber may be provided inside of the cylinder so as to communicate with the third gas spring chamber via a communication path formed in the piston. Therefore, it is possible to increase the volume of the third gas spring chamber, and to decrease a compression ratio even in high-pressure conditions. Therefore, it is possible to stabilize the reaction force characteristics in the vicinity of an extension limit of the extension operation.

In a further aspect, a gas chamber for adjusting the internal compression ratio of the third gas spring chamber may be provided so as to communicate with the inside of the rod and the third gas spring chamber via the second end opening of the rod fixed to the first end fixation portion. Therefore, it is possible to further increase the volume of the third gas spring chamber, and to decrease a compression ratio even in the high-pressure conditions.

In another further aspect, the first end of the inner tube and the first end of the cylinder may be fixed to the first end fixation portion, and the second end of the outer tube and the second end of the rod may be fixed to the second end fixation portion. Therefore, in a so-called upright shock absorber, it is able to achieve both reducing the friction during the compression operation and the extension operation, and stabilizing the reaction force characteristics of each of the gas spring chambers.

In a yet further aspect, a space between an inner circumferential surface of the inner tube and an outer circumferential surface of the cylinder may form a gas chamber for adjusting the internal compression ratio of the third gas spring chamber, which communicates with the third gas spring chamber. Therefore, it is possible to increase the volume of the third gas spring chamber, and to decrease a compression ratio even in the high-pressure conditions. Therefore, it is possible to stabilize the reaction force characteristics in the vicinity of an extension limit of the extension operation.

In a still further aspect, the first end fixation portion may be connected to an axle of a motorcycle, and the second end fixation portion may be connected to a vehicle body of the motorcycle. Therefore, a front fork of the motorcycle can be configured to provide the aforementioned effects.

BRIEF DESCRIPTION OF THE DRAWINGS

FIG. 7 is a view of a lip packing (an example in the related art) which has been cut.

FIG. 8 is a sectional view of a rod lip packing for the balance chamber or a piston lip packing mounted in the packing mounting groove (an example in the related art).

FIG. 9 is a view illustrating the rod lip packing for the balance chamber when the fluid pressure is applied to a region between the outer circumferential lip and the inner circumferential lip of the rod lip packing for the balance chamber, and distribution of the contact surface pressure in this state (an example in the related art).

DESCRIPTION OF EMBODIMENTS

Embodiment 1

A shock absorber 1 in Embodiment 1 will be described with reference to FIGS. 1 to 4. The description of this specification will be given based on the condition that sides illustrated by arrows in FIG. 1 and the like represent a first end side and a second end side, respectively.

Figure 1:
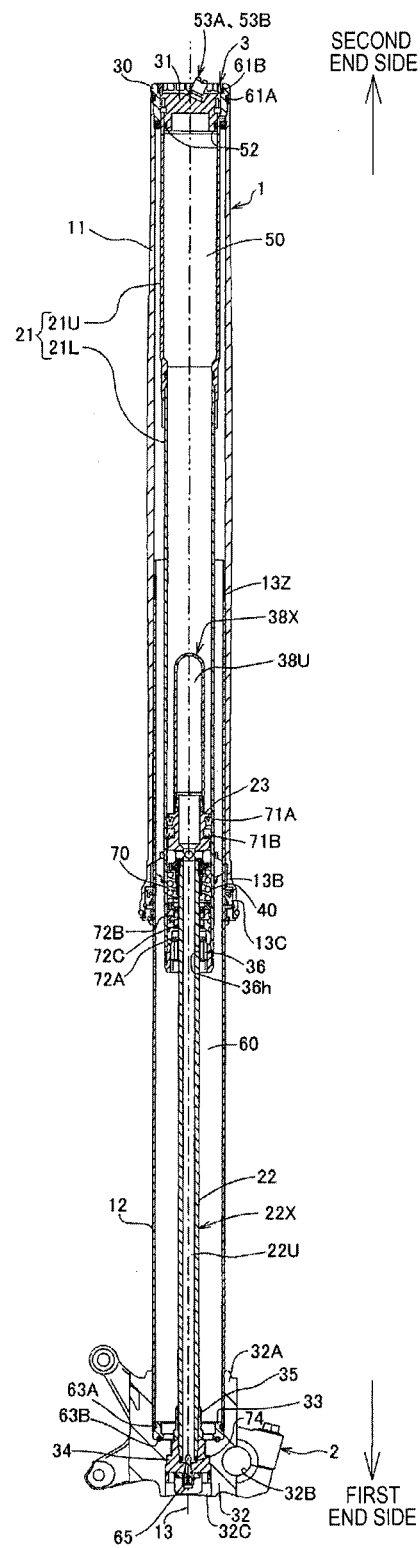
FIG. 1 is a sectional view illustrating an entire shock absorber (Embodiment 1).

As illustrated in FIG. 1, the shock absorber 1 includes a first end fixation portion 2; a second end fixation portion 3; an outer tube 11; an inner tube 12; a cylinder 21; a rod 22; a piston 23; a rod guide 36; multiple gas spring chambers; and lip packings for maintaining air-tight sealing between the gas spring chambers that are adjacent to each other.

The shock absorber 1 is configured such that a first end of the inner tube 12 with a circular cylindrical shape is fixed to the first end fixation portion 2 in such a way that a first end opening of the inner tube 12 is sealed, a second end of the outer tube 11 with a circular cylindrical shape is fixed to the second end fixation portion 3 in such a way that a second end opening of the outer tube 11 is sealed, a second end of the inner tube 12 is inserted into the outer tube 11 via a first end opening of the outer tube 11, and the inner tube 12 and the outer tube 11 can move relative to each other along a center axis 13 of the inner tube 12 and the outer tube 11 in a state where air-tight sealing between an outer circumferential surface of the inner tube 12 and an inner circumferential surface of the outer tube 11 is formed. Therefore, in a compression stroke, the first end fixation portion 2 and the second end fixation portion 3 move in such a way as to approach each other, and in an extension stroke, the first end fixation portion 2 and the second end fixation portion 3 move in such a way as to move away from each other.

The shock absorber 1 includes the cylinder 21 and the rod 22 inside of the outer tube 11 and the inner tube 12. The cylinder 21 is formed in a circular cylindrical shape with a diameter smaller than an inner diameter of the inner tube 12, and the rod 22 is formed in a circular cylindrical shape with a diameter smaller than an inner diameter of the cylinder 21.

A first end of the rod 22 is fixed to the first end fixation portion 2 in such a way that a first end opening of the rod 22 is sealed, a second end of the cylinder 21 is fixed to the second end fixation portion 3 in such a way that a second end opening of the cylinder 21 is sealed, a second end of the rod 22 is inserted into the cylinder 21 via a rod through hole 36h of the rod guide 36 provided at a first end opening of the cylinder 21, and the piston 23 is provided at the second end of the rod 22 which is inserted into the cylinder 21.

For example, the cylinder 21 is configured such that a second end of a first end cylinder 21L is connected to a first end of a second end cylinder 21U, a second end of the second end cylinder 21U is fixed to the second end fixation portion 3, and the rod guide 36 is provided at a first end opening of the first end cylinder 21L.

The outer tube 11, the inner tube 12, the cylinder 21, the rod 22, and the piston 23 are provided coaxially with a center axis 13.

That is, when the first end fixation portion 2 and the second end fixation portion 3 move in such a way as to approach each other, or as to move away from each other, the piston 23 and the rod guide 36 can move along the center axis 13 in such a way as to approach each other, or as to move away from each other in a state where air-tight sealing between an outer circumferential surface 23f of the piston 23, provided at the second end of the rod 22, and an inner circumferential surface 21u of the cylinder 21 is maintained, and air-tight sealing between an outer circumferential surface RF of the rod 22 and the inner circumferential surface of the rod through hole 36h of the rod guide 36 is maintained.

An interior of the shock absorber 1 is divided into an inner chamber 50 as a first gas spring chamber; an outer chamber 60 as a second gas spring chamber; and a balance chamber 70 as a third gas spring chamber. The shock absorber 1 includes a lip packing for maintaining air-tight sealing between the balance chamber 70 and the inner chamber 50 that are adjacent to each other, and a lip packing for maintaining air-tight sealing between the balance chamber 70 and the outer chamber 60 that are adjacent to each other.

The inner chamber 50 is formed as a sealed space which is surrounded by the second end fixation portion 3, the piston 23, an inner circumferential surface of the cylinder 21 between the second end fixation portion 3 and the piston 23, and an outer circumferential surface of a sub-tank 38X.

The outer chamber 60 is formed as a sealed space which is surrounded by the outer circumferential surface RF of the rod 22, the first end fixation portion 2, the inner circumferential surfaces of the inner tube 12 and the outer tube 11, the second end fixation portion 3, an outer circumferential surface of the cylinder 21, and a first end of the rod guide 36.

The balance chamber 70 is formed as a sealed space which is surrounded by the piston 23, the rod guide 36, and the inner circumferential surface of the cylinder 21 between the piston 23 and the rod guide 36.

A gas chamber 22U inside of the rod 22 communicates with the balance chamber 70 via a communication path 23B formed in the piston 23 such that the circular cylindrical rod 22 works as a sub-tank 22X that forms the gas chamber 22U for adjusting a compression ratio inside the balance chamber 70.

The sub-tank 38X is provided at a second end of the piston 23 inside of the cylinder 21, and forms a gas chamber 38U for adjusting the internal compression ratio of the balance chamber 70 such that the gas chamber 38U communicates with the balance chamber 70 and the gas chamber 22U of the rod 22 via the communication path 23B formed in the piston 23.

A rebound spring 40 is provided between a first end of the piston 23 and a second end of the rod guide 36 inside of the balance chamber 70 in such a way that the rebound spring 40 extends in a spiral manner along the center axis 13 of the rod 22 outside of the outer circumferential surface RF of the rod 22.

Figure 2:
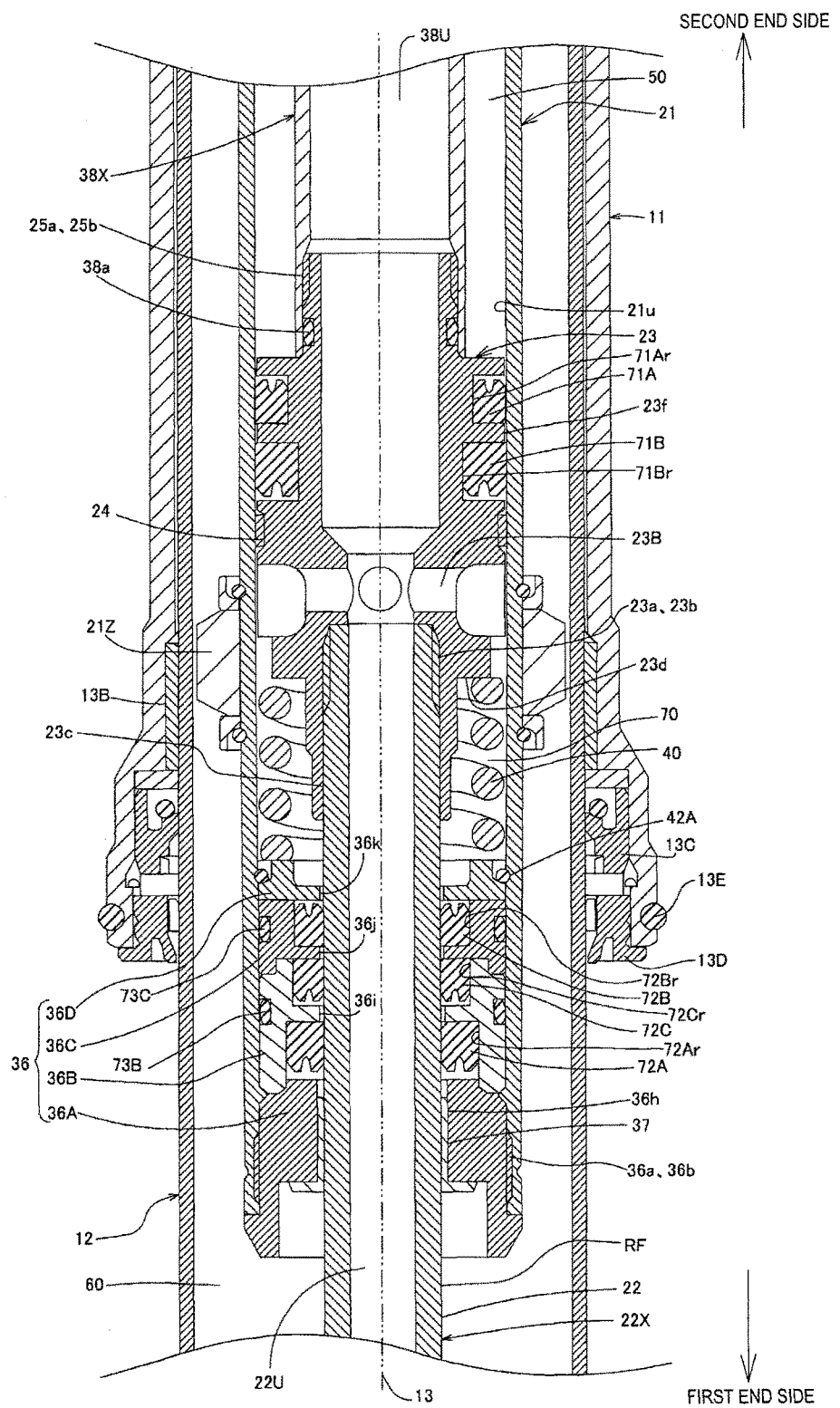
FIG. 2 is an enlarged sectional view illustrating vicinities of a rod guide and a piston of the shock absorber (Embodiment 1).

In Embodiment 1, as illustrated in FIG. 2, a rod lip packing 72B is provided at the closest position to a first end of the balance chamber 70, a piston lip packing 71B is provided at the closest position to a second end of the balance chamber 70, and the rod lip packing 72B and the piston lip packing 71B are disposed in such a way that the lips of the rod lip packing 72B and the piston lip packing 71B face each other. Consequently, the rod lip packing 72B and the piston lip packing 71B work as the rod lip packing 72B for the balance chamber 70 and the piston lip packing 71B for the balance chamber 70 so that gas and sliding oil in the balance chamber 70 can be prevented from leaking to the outer chamber 60 and the inner chamber 50 when being compressed during extension operation of the shock absorber 1.

Figure 3:
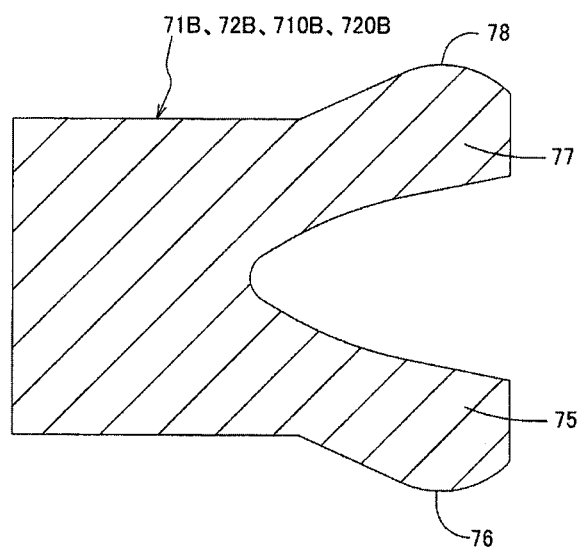
FIG. 3 is a sectional view of a rod lip packing for a balance chamber or a piston lip packing for the balance chamber (Embodiments 1 and 2).

As the rod lip packing 72B for the balance chamber 70 and the piston lip packing 71B for the balance chamber 70, lip packings in which a minimum-diameter inner circumferential edge 76 of an inner circumferential lip 75 has an arc-shaped section and a maximum-diameter outer circumferential edge 78 of an outer circumferential lip 77 has an arc-shaped section as illustrated in FIG. 3 are used.

Figure 4:
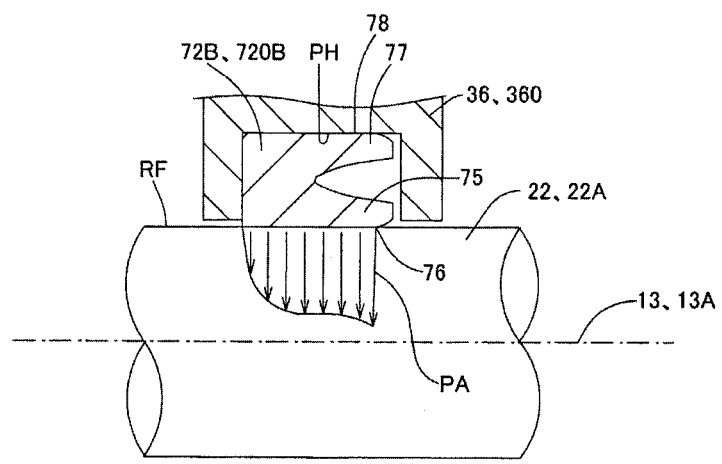
FIG. 4 is a view illustrating the rod lip packing for the balance chamber when fluid pressure is applied to a region between an outer circumferential lip and an inner circumferential lip of the rod lip packing mounted in a packing mounting groove, and distribution of a contact surface pressure in this state (Embodiments 1 and 2).

As illustrated in FIG. 4, when the rod lip packing 72B for the balance chamber 70 is mounted in a packing mounting groove PH formed in the rod guide 36, during the extension operation of the shock absorber 1, the gas in the balance chamber 70 is compressed, and fluid pressure (oil pressure and gas pressure) is applied to a region between the outer circumferential lip 77 and the inner circumferential lip 75 of the rod lip packing 72B for the balance chamber 70, a contact surface pressure PA between the minimum-diameter inner circumferential edge 76 of the rod lip packing 72B for the balance chamber 70 and the outer circumferential surface RF of the rod 22 is smaller than a contact surface pressure PM (refer to FIG. 9) therebetween when a minimum-diameter inner circumferential edge PE is formed in an edge shape (refer to FIG. 8).

As illustrated in FIG. 2, when the piston lip packing 71B for the balance chamber 70 is mounted in a packing mounting groove formed in the piston 23, during the extension operation of the shock absorber 1, the gas in the balance chamber 70 is compressed, and the fluid pressure is applied to the region between the outer circumferential lip 77 and the inner circumferential lip 75 of the piston lip packing 71B for the balance chamber 70, a contact surface pressure between the maximum-diameter outer circumferential edge 78 of the piston lip packing 71B for the balance chamber 70 and the inner circumferential surface 21u of the cylinder 21 is smaller than the contact surface pressure therebetween when the maximum-diameter outer circumferential edge PD is formed in the edge shape (refer to FIG. 8).

Accordingly, friction during the compression operation and the extension operation of the shock absorber 1 is reduced, and the compression operation and the extension operation are smoothly performed.

In the rod lip packing 72B for the balance chamber 70, and the piston lip packing 71B for the balance chamber 70, an arc-shaped surface of a minimum-diameter inner circumferential edge 76 protrudes toward the center axis 13. In the rod lip packing 72B for the balance chamber 70, and the piston lip packing 71B for the balance chamber 70, an arc-shaped surface of the maximum-diameter outer circumferential edge 78 protrudes in a direction away from the center axis 13.

In the rod lip packing 72B for the balance chamber 70, and the piston lip packing 71B for the balance chamber 70, the arc-shaped surface of the minimum-diameter inner circumferential edge 76 and the arc-shaped surface of the maximum-diameter outer circumferential edge 78 are formed with a radial dimension (R dimension) of greater than 0.1 mm and less than 0.4 mm. Preferably, the radial dimension of the arc-shaped surfaces is in a range from 0.2 mm to 0.3 mm. When the arc-shaped surfaces are formed with the radial dimension of 0.2 mm to 0.3 mm, oil film retention between the minimum-diameter inner circumferential edge 76 and the outer circumferential surface RF of the rod 22, and between the maximum-diameter outer circumferential edge 78 and the inner circumferential surface 21u of the cylinder 21 is improved, the friction during the compression operation and the extension operation is reduced, and the compression operation and the extension operation of the shock absorber 1 are smoothly performed.

If the arc-shaped surfaces have a radial dimension less than or equal to 0.1 mm, a difference between a start-up torque value and a dynamic frictional value during the compression operation and the extension operation of the shock absorber 1 is increased, and a load is increased when switching between the compression operation and the extension operation occurs. Therefore, oil film shortage between the minimum-diameter inner circumferential edge 76 and the outer circumferential surface RF of the rod 22, and between the maximum-diameter outer circumferential edge 78 and the inner circumferential surface 21u of the cylinder 21 may occur, and dynamic friction is likely to be increased, which is not desirable. If the arc-shaped surfaces have a radial dimension greater than or equal to 0.4 mm, performance of sealing between the minimum-diameter inner circumferential edge 76 and the outer circumferential surface RF of the rod 22, and between the maximum-diameter outer circumferential edge 78 and the inner circumferential surface 21u of the cylinder 21 may deteriorate, which is not desirable.

To return to the preferred embodiment, since the contact surface pressures between the minimum-diameter inner circumferential edge 76 of the rod lip packing 72B for the balance chamber 70 and the outer circumferential surface RF of the rod 22, and between the maximum-diameter outer circumferential edge 78 of the piston lip packing 71B for the balance chamber 70 and the inner circumferential surface 21u of the cylinder 21 are reduced, it cannot be said that there is no possibility at all that slide lubricating oil in the balance chamber 70 moves from the balance chamber 70 to the outer chamber 60, or from the balance chamber 70 to the inner chamber 50. However, even if, by any possibility, the slide lubricating oil in the balance chamber 70 moves from the balance chamber 70 to the outer chamber 60, or from the balance chamber 70 to the inner chamber 50, since an amount of the slide lubricating oil sealed in the balance chamber 70 is small, the leaking slide lubricating oil may be unlikely to considerably affect pre-set reaction force characteristics of each of the gas spring chambers in the shock absorber 1, and the reaction force characteristics of each of the gas spring chambers are stable.

If a lip packing having the edge shape (refer to FIG. 8) at the maximum-diameter outer circumferential edge 78 which is in contact with the circumferential surface of the packing mounting groove is used as the rod lip packing 72B for the balance chamber 70, when the fluid pressure is applied to a region between the outer circumferential lip 77 and the inner circumferential lip 75, a contact surface pressure between a circumferential surface 72Br (refer to FIG. 2) of the packing mounting groove and the maximum-diameter outer circumferential edge 78 is maximized. Therefore, gas and oil, which have a tendency of passing through the gap between the circumferential surface 72Br of the packing mounting groove and the maximum-diameter outer circumferential edge 78, are prevented from moving from the balance chamber 70 to the outer chamber 60, and the reaction force characteristics of each of the gas spring chambers become more stable.

In addition, if a lip packing having the edge shape at the minimum-diameter inner circumferential edge 76 which is in contact with a circumferential surface 71Br (refer to FIG. 2) of the packing mounting groove is used as the piston lip packing 71B for the balance chamber 70, when the fluid pressure is applied to the region between the outer circumferential lip 77 and the inner circumferential lip 75, a contact surface pressure between the circumferential surface 71Br of the packing mounting groove and the minimum-diameter inner circumferential edge 76 is maximized. Therefore, the gas and the oil, which have a tendency of passing through a gap between the circumferential surface 71Br of the packing mounting groove and the minimum-diameter inner circumferential edge 76, are prevented from moving from the balance chamber 70 to the inner chamber 50, and the reaction force characteristics of each of the gas spring chambers become more stable.

Meanwhile, as rod lip packings 72A and 72C for the outer chamber 60 which are rod lip packings for the outer chamber 60 other than the rod lip packing for the balance chamber 70, and are mounted in such a way that the lips of the rod lip packings 72A and 72C for the outer chamber 60 face the first end fixation portion 2, lip packings having the edge shapes at a section of the minimum-diameter inner circumferential edge 76 of the inner circumferential lip 75 in contact with the outer circumferential surface RF of the rod 22 and at a section of the maximum-diameter outer circumferential edge 78 of the outer circumferential lip 77 in contact with each of circumferential surfaces 72Ar and 72Cr of the packing mounting grooves are used. In other words, lip packings with the configuration illustrated in FIG. 8 are used as the rod lip packings 72A and 72C for the outer chamber 60. Further, as a piston lip packing 71A for the inner chamber 50 which is a piston lip packing for the inner chamber 50 other than the piston lip packing for the balance chamber 70, and is mounted in such a way that the lip of the piston lip packing 71A for the inner chamber 50 faces the second end fixation portion 3, a lip packing having the edge shapes at a maximum-diameter outer circumferential edge 78 of the outer circumferential lip 77 in contact with the inner circumferential surface 21u of the cylinder 21 and at a section of the minimum-diameter inner circumferential edge 76 of the inner circumferential lip 75 in contact with a circumferential surface 71Ar of the packing mounting groove is used. In other words, a lip packing with the configuration illustrated in FIG. 8 is used as the piston lip packing 71A for the inner chamber 50.

In this case, when the fluid pressure is applied to a region between the outer circumferential lip 77 and the inner circumferential lip 75 during the compression operation of the shock absorber 1, a contact surface pressure between the minimum-diameter inner circumferential edges 76 of the rod lip packings 72A and 72C for the outer chamber 60 and the outer circumferential surface RF of the rod 22 is maximized, and a contact surface pressure between the maximum-diameter outer circumferential edge 78 and the circumferential surfaces 72Ar and 72Cr of the packing mounting grooves is maximized. In addition, a contact surface pressure between the maximum-diameter outer circumferential edge 78 of the piston lip packing 71A for the inner chamber 50 and the inner circumferential surface 21u of the cylinder 21 is maximized, and a contact surface pressure between the minimum-diameter inner circumferential edge 76 and the circumferential surface 71Ar of the packing mounting groove is maximized.

Accordingly, the gas and the oil are prevented from moving from the outer chamber 60 to the balance chamber 70, and from the inner chamber 50 to the balance chamber 70, and the pre-set reaction force characteristics of each of the gas spring chambers in the shock absorber 1 become stable.

In the gas spring shock absorber 1 according to Embodiment 1, it is possible to reduce the friction during the compression operation and the extension operation, it is possible to prevent the compression ratio adjustment oil from moving from the inner chamber 50 to the balance chamber 70, and from the outer chamber 60 to the balance chamber 70, and it is possible to stabilize the pre-set reaction force characteristics of each of the gas spring chambers. That is, it is possible to provide the gas spring shock absorber 1 in which both reducing the friction during the compression operation and the extension operation and stabilizing the reaction force characteristics of each of the gas spring chambers are achieved.

The shock absorber 1 in Embodiment 1 is used as at least one front fork leg of a right front fork leg and a left front fork leg which constitute a front fork of a motorcycle or the like. In a front fork which has the right front fork leg and the left front fork leg, and functions of which is divided between the right front fork leg and the left front fork leg, one of these two front fork legs is a damper leg with a damper, and the other of these two front fork legs is a spring leg with a spring, the shock absorber 1 may be used as a spring leg having a gas spring in replacement of a metal spring.

For example, since the first end fixation portion 2 is connected to an axle of the motorcycle, and the second end fixation portion 3 is connected to a frame or the like which configures a body of the motorcycle, the shock absorber 1 is configured as an inverted front fork leg in which the rod 22 is positioned on a lower side and the cylinder 21 is positioned on an upper side.

The front fork leg undergoes the compression operation in which a lower end (first ends of the inner tube 12 and the rod 22) of the front fork leg and an upper end (second ends of the outer tube 11 and the cylinder 21) of the front fork leg approach each other, and the extension operation in which the lower end of the front fork leg and the upper end of the front fork leg move away from each other.

In the compression operation in which the lower end of the front fork leg and the upper end of the front fork leg approach each other, the volumes of the inner chamber 50 and the outer chamber 60 are reduced, and gas in the inner chamber 50 and the outer chamber 60 is compressed. Therefore, a gas spring is formed to generate a reaction force which biases the lower end of the front fork and the upper end of the front fork to move away from each other.

In the extension operation in which the lower end of the front fork leg and the upper end of the front fork leg move away from each other, the piston 23 and the rod guide 36 move in such a way as to approach each other, and thus the volume of the rebound gas spring chamber 70 is reduced, and gas in the balance chamber 70 is compressed. At this time, gas sealed in the balance chamber 70, and the sub-tank 22X formed by the rod 22 and the sub-tank 38X inside of the cylinder 21 work as a gas spring in communication with the balance chamber 70, and generates a reaction force such that the front fork leg is caused to be compressed.

Hereinafter, an overall configuration of the shock absorber 1 will be described in detail with reference to FIGS. 1 and 2.

A seal member 13C and a dust seal 13D are provided on the inner circumferential surface at the first end opening of the outer tube 11. Multiple bushes 13Z and 13B are provided on the inner circumferential surface of the outer tube 11. Consequently, the outer circumferential surface of the inner tube 12 can slide on the inner circumferential surface of the outer tube 11 while air-tight sealing therebetween is maintained via the bushes 13Z and 13B, the seal member 13C, and the dust seal 13D. A stopper ring 13E is fitted on an outer circumferential surface of the outer tube 11 at a portion close to the first end opening of the outer tube 11, such that a dust cover (not illustrated) for protecting the inner tube 12 does not damage the outer tube 11 due to slide contact between the dust cover and the outer tube 11.

The rod guide 36 is configured as a combination of a cover 36A, a first end side packing mounting piece 36B, a second end side packing mounting piece 36C, and a spring seat and packing gland 36D.

The cover 36A, the first end side packing mounting piece 36B, the second end side packing mounting piece 36C, and the spring seat and packing gland 36D are annular members, at the centers of which the respective rod through holes 36h, 36i, 36j, and 36k are formed to allow the rod 22 to pass therethrough. The outer circumferential surface of the cover 36A is provided with a screw portion 36b fitted to a screw portion 36a that is formed in the inner circumferential surface at the first end opening of the cylinder 21. The screw portions 36a and 36b are tightened together, and thus the cover 36A is fixed to the inside of the first end opening of the cylinder 21 using screw fitting. A bush 37 is provided on an inner circumferential surface of the rod through hole 36h of the cover 36A, and the outer circumferential surface RF of the rod 22 can slide on an inner circumferential surface of the bush 37.

The first end side packing mounting piece 36B is attached to a second end of the cover 36A. An O-ring 73B is mounted in an O-ring mounting groove formed at the outer circumferential surface of the first end side packing mounting piece 36B. Packing mounting grooves centered on the rod through hole 36i are respectively formed at a first end surface and a second end surface of the first end side packing mounting piece 36B. The rod lip packing 72A for the outer chamber 60 is mounted in the packing mounting groove formed in a first end surface of the first end side packing mounting piece 36B. The rod lip packing 72C for the outer chamber 60 is mounted in the packing mounting groove formed in the second end surface of the first end side packing mounting piece 36B.

The second end side packing mounting piece 36C is mounted on the second end surface of the first end side packing mounting piece 36B. An O-ring 73C is mounted in an O-ring mounting groove formed at the outer circumferential surface of the second end side packing mounting piece 36C. A packing mounting groove centered on the rod through hole 36j is formed at a second end surface of the second end side packing mounting piece 36C, and the rod lip packing 72B for the balance chamber 70 is mounted in this packing mounting groove.

The spring seat and packing gland 36D is mounted on the second end surface of the second end side packing mounting piece 36C, and is fixed to the inner circumferential surface of the cylinder 21 using a retaining ring 42A such that the second end side packing mounting piece 36C and the rod lip packing 72B for the balance chamber 70 mounted in the packing mounting groove in the second end side packing mounting piece 36C are prevented from moving toward the second end side. The spring seat and packing gland 36D works as a spring seat to which a first end of the rebound spring 40 is seated.

The second end of the rod 22 passes through the rod through hole 36h of the rod guide 36, is inserted into the cylinder 21, and passes through a spiral central hole of the rebound spring 40 inserted into the cylinder 21, and then the piston 23 is attached to the second end of the rod 22. That is, an insertion hole 23c, into which a second end portion of the rod 22 is inserted, is formed at a center of the first end of the columnar piston 23, and an outer circumferential surface of the second end portion of the rod 22 is provided with a screw portion 23b screw-fitted to a screw portion 23a that is formed in the inner circumferential surface of the insertion hole 23c. The screw portions 23a and 23b are tightened together, the first end opening of the piston 23 is fixed to the second end of the rod 22 using screw fitting. An outer diameter of an outer circumferential surface of a portion where the insertion hole 23c is formed in the piston 23 is smaller than an inner diameter of the spiral central hole of the rebound spring 40, and an outer circumferential surface of the insertion hole 23c enters the spiral central hole via a second end opening of the spiral central hole of the rebound spring 40. A spring colliding surface 23d is formed at a second end of the outer circumferential surface of the portion where the insertion hole 23c is formed in the piston 23, and is a surface a diameter of which is greater than that of the outer circumferential surface of the portion where the insertion hole 23c is formed in the piston 23. A second end of the rebound spring 40 collides with the spring colliding surface 23d, and thus the rebound spring 40 is prevented from extending past a predetermined distance.

On the piston 23, circular annular packing mounting grooves centered on the center axis 13 of the piston 23 are respectively provided at a first end and a second end of an outer circumferential surface facing the inner circumferential surface of the cylinder 21. A circular annular piston ring mounting groove centered on the center axis 13 of the piston is formed at the first end of the outer circumferential surface of the piston 23. Slidability of the piston 23 is improved due to contact between a piston ring 24 mounted in the piston ring mounting groove and the inner circumferential surface 21u of the cylinder 21. As described above, the piston lip packing 71A for the inner chamber 50 is mounted in the packing mounting groove at the second end of the outer circumferential surface of the piston 23, and the piston lip packing 71B for the balance chamber 70 is mounted in the packing mounting groove at the first end of the outer circumferential surface of the piston 23.

The second end of the piston 23 includes a sub-tank connection portion. The sub-tank connection portion is formed in a cylindrical shape, and a diameter of an outer circumferential surface of the sub-tank connection portion is smaller than that of the outer circumferential surface of the piston 23. The sub-tank 38X is formed as a hollow bar-like container with an open first end and a blocked second end. A second end of the outer circumferential surface of the sub-tank connection portion is provided with a screw portion 25b fitted to a screw portion 25a that is formed on the inner circumferential surface of the sub-tank 38X at a portion close to the first end opening of the sub-tank 38X. The screw portions 25a and 25b are tightened together, and thus the first end opening of the sub-tank 38X is fixed to the sub-tank connection portion at the second end of the piston 23 using screw fitting. 38a represents a seal member of the sub-tank connection portion.

The communication path 23B is formed in the piston 23, and the gas chamber 38U inside of the sub-tank 38X, and the gas chamber 22U formed inside of the rod 22 communicate with the balance chamber 70 via the communication path 23B. That is, since the shock absorber 1 includes the sub-tank 22X formed by the rod 22 that partitions off the gas chamber 22U formed inside the rod 22 while communicating with the balance chamber 70, it is possible to increase a volume of the balance chamber 70, and to decrease a compression ratio even in high-pressure conditions. Accordingly, it is possible to stabilize the reaction force characteristics in a vicinity of an extension limit of the extension operation, and to improve operation stability.

In addition, the sub-tank 38X is provided inside of the cylinder 21, while forming the gas chamber 38U for adjusting the internal compression ratio of the balance chamber 70, and communicating with the balance chamber 70 via the communication path 23B formed in the piston 23, it is possible to increase the volume of the balance chamber 70, and to decrease a compression ratio even in high-pressure conditions. Therefore, it is possible to stabilize the reaction force characteristics in the vicinity of the extension limit of the extension operation, and to improve the operation stability. Since the shock absorber 1 includes the sub-tanks 22X and 38X, it is possible to further stabilize the reaction force characteristics in the vicinity of the extension limit of the extension operation.

An oscillation preventive collar 21Z is attached to a first end of an outer circumferential portion of the cylinder 21 with an annular gap formed between the oscillation preventive collar 21Z and an inner circumferential surface of the inner tube 12.

As illustrated in FIG. 1, for example, the first end fixation portion 2, connected to the axle of the motorcycle, includes a bracket 32; a bottom piece 33; and a bottom bolt 34.

The bottom piece 33 is attached to the first end opening of the inner tube 12 in such a way that the first end opening of the inner tube 12 is sealed.

The bracket 32 includes a fitting portion 32A that is fitted to the first end of the inner tube 12 to which the bottom piece 33 is attached; a connection hole 32B for connecting the axle; and a bottom bolt attaching hole 32C in which the bottom bolt 34 is attached. A first end portion of the rod 22 passes through a central hole of the bottom piece 33 inserted into the fitting portion 32A, protrudes into the bottom bolt attaching hole 32C, is screwed into the bottom bolt 34 attached to the bottom bolt attaching hole 32C, and is fixed with a lock nut 35. In the first end fixation portion 2, air-tight sealing between the inside of the inner tube 12 and the outside, and between the inside of the rod 22 and the outside is maintained due to seal members 63A, 63B, 74, and the like such as O-rings.

A gas pressure adjustment unit 65 is provided in the bottom bolt 34 in such a way as to communicate with the inside of the rod 22 via the first end opening of the rod 22. By virtue of the gas pressure adjustment unit 65, it is possible to prevent gas from flowing to the outside from an internal space of the rod 22, and it is possible to adjust the gas pressure of the balance chamber 70 by adjusting the compression ratio of gas in the balance chamber 70 via the gas chamber 22U inside of the rod 22.

The second end fixation portion 3 is configured to include a second end portion of the outer tube 11, and a cap 30 and a bolt portion 31 which air-tightly block the second end openings of the outer tube 11 and the cylinder 21. The second end portion of the outer tube 11, in which the second end openings of the outer tube 11 and the cylinder 21 are blocked with the cap 30 and the bolt portion 31, is connected to the frame or the like which configures the body of the motorcycle. In the second end fixation portion 3, air-tight sealing between the inside of the outer tube 11 and the outside, and between the inside of the cylinder 21 and the outside is maintained due to seal members 52, 61A, 61B, and the like such as O-rings.

The bolt portion 31 includes an inner chamber gas pressure adjustment unit 53A for adjusting a pressure of gas sealed in the inner chamber 50, and an outer chamber gas pressure adjustment unit 53B for adjusting a pressure of gas sealed in the outer chamber 60.

If the first end fixation portion 2 is provided with a sub-tank (not illustrated) that communicates with the gas chamber 22U inside of the rod 22 via the first end opening of the rod 22, it is possible to further increase the volume of the balance chamber 70, and to decrease a compression ratio even in high-pressure conditions. That is, if a sub-tank (not illustrated) is provided and forms a gas chamber for adjusting the compression ratio in the balance chamber 70 such that the gas chamber communicates with the gas chamber 22U inside of the rod 22 and the balance chamber 70 via the first end opening of the rod 22 fixed to the first end fixation portion 2, it is possible to further increase the volume of the balance chamber 70, and to decrease the compression ratio even in high-pressure conditions.

It is sufficient that at least the sub-tank 22X, which forms the gas chamber 22U inside of the rod 22 in communication with the balance chamber 70, is provided as a sub-tank.

Embodiment 2

A shock absorber 1A in Embodiment 2 will be described with reference to FIGS. 5 and 6 and also FIGS. 3 and 4.

The shock absorber 1A is configured such that a first end of an inner tube 12A with a circular cylindrical shape is fixed to a first end fixation portion 2A in such a way that a first end opening of the inner tube 12A is sealed, a second end of an outer tube 11A with a circular cylindrical shape is fixed to a second end fixation portion 3A in such a way that a second end opening of the outer tube 11A is sealed, a second end of the inner tube 12A is inserted into the outer tube 11A via a first end opening of the outer tube 11A, and the inner tube 12A and the outer tube 11A can move relative to each other along a center axis 13A of the inner tube 12A and the outer tube 11A in a state where air-tight sealing between an outer circumferential surface of the inner tube 12A and an inner circumferential surface of the outer tube 11A is formed. Therefore, the first end fixation portion 2A and the second end fixation portion 3A move in such a way as to approach each other, or as to move away from each other.

The shock absorber 1A includes a cylinder 21A and a rod 22A inside of the outer tube 11A and the inner tube 12A. The cylinder 21A is formed in a cylindrical shape with a diameter smaller than an inner diameter of the inner tube 12A, and the rod 22A is formed in a cylindrical shape with a diameter smaller than an inner diameter of the cylinder 21A.

A first end of the cylinder 21A is fixed to the first end fixation portion 2A in such a way that a first end opening of the cylinder 21A is sealed, a second end of the rod 22A is fixed to the second end fixation portion 3A in such a way that a second end opening of the rod 22A is sealed, a first end of the rod 22A is inserted into the cylinder 21A via a rod through hole 360$h$ of a rod guide 360 provided at a second end opening of the cylinder 21A, and a piston 230 is provided on a first end portion of the rod 22A which is inserted into the cylinder 21A.

The outer tube 11A, the inner tube 12A, the cylinder 21A, the rod 22A, the piston 230, and the rod guide 360 are provided coaxially with a center axis 13A.

When the first end fixation portion 2A and the second end fixation portion 3A move in such a way as to approach each other, or as to move away from each other, the piston 230 and the rod guide 360 move along the center axis 13A in such a way as to move away from each other, or as to approach each other in a state where air-tight sealing between an outer circumferential surface 230$f$ of the piston 230, provided on the first end portion of the rod 22A, and an inner circumferential surface 210$u$ of the cylinder 21A is maintained, and air-tight sealing between an outer circumferential surface RF of the rod 22A and an inner circumferential surface of the rod through hole 360$h$ of the rod guide 360 is maintained.

Figure 6:
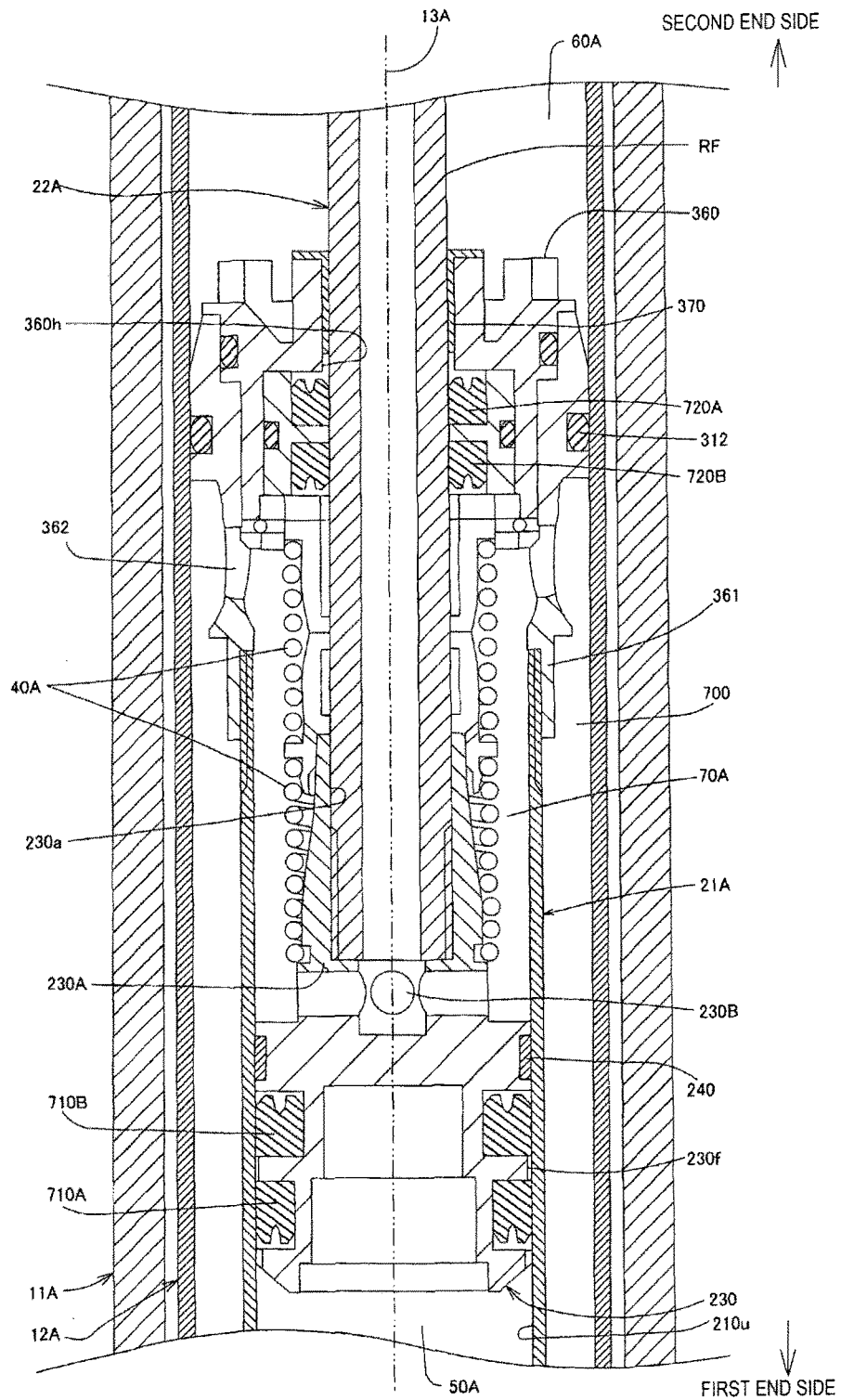
FIG. 6 is an enlarged sectional view illustrating vicinities of a rod guide and a piston of the shock absorber (Embodiment 2).

As illustrated in FIG. 6, a rebound spring 40A is provided between a second end of the piston 230 and a first end of the rod guide 360 in such a way that the rebound spring 40A extends in a spiral manner along the center axis 13A of the rod 22A outside of the outer circumferential surface RF of the rod 22A.

A gas chamber inside of the rod 22A communicates with a balance chamber 70A (which is a third gas spring chamber) via a communication path 230B formed in the piston 230 such that the circular cylindrical rod 22A works as a sub-tank that forms the gas chamber for adjusting a compression ratio inside the balance chamber 70A.

An interior of the shock absorber 1A is divided into an inner chamber 50A as a first gas spring chamber; an outer chamber 60A as a second gas spring chamber; and the balance chamber 70A as the third gas spring chamber. The shock absorber 1A includes a lip packing for maintaining air-tight sealing between the balance chamber 70A and the inner chamber 50A that are adjacent to each other, and a lip packing for maintaining air-tight sealing between the balance chamber 70A and the outer chamber 60A that are adjacent to each other.

The inner chamber 50A is formed as a space which is surrounded by the first end fixation portion 2A, the piston 230, and an inner circumferential surface of the cylinder 21A between the first end fixation portion 2A and the piston 230.

The outer chamber 60A is formed as a sealed space which is surrounded by the outer circumferential surface RF of the rod 22A, the second end fixation portion 3A, the inner circumferential surfaces of the inner tube 12A and the outer tube 11A, and the rod guide 360.

The balance chamber 70A is formed as a space which is surrounded by the piston 230, the rod guide 360, and an inner circumferential surface $210u$ of the cylinder 21A between the piston 230 and the rod guide 360.

In Embodiment 2, as illustrated in FIG. 6, a rod lip packing 720B is provided at the closest position to a second end of the balance chamber 70A, a piston lip packing 710B is provided at the closest position to a first end of the balance chamber 70A, and the rod lip packing 720B and the piston lip packing 710B are disposed in such a way that the lips of the rod lip packing 720B and the piston lip packing 710B face each other. Consequently, the rod lip packing 720B and the piston lip packing 710B work as the rod lip packing 720B for the balance chamber 70A and the piston lip packing 710B for the balance chamber 70A so that gas and sliding oil in the balance chamber 70A can be prevented from leaking to the outer chamber 60A and the inner chamber 50A when being compressed during extension operation of the shock absorber 1A.

As the rod lip packing 720B for the balance chamber 70A and the piston lip packing 710B for the balance chamber 70A, lip packings in which a minimum-diameter inner circumferential edge 76 of an inner circumferential lip 75 has an arc-shaped section and a maximum-diameter outer circumferential edge 78 of an outer circumferential lip 77 has an arc-shaped section as illustrated in FIG. 3 are used.

As illustrated in FIG. 4, when the rod lip packing 720B for the balance chamber 70A is mounted in a packing mounting groove PH formed in the rod guide 360, during the extension operation of the shock absorber 1A, the gas in the balance chamber 70A is compressed, and fluid pressure (oil pressure and gas pressure) is applied to a region between the outer circumferential lip 77 and the inner circumferential lip 75 of the rod lip packing 720B for the balance chamber 70A, a contact surface pressure PA between the minimum-diameter inner circumferential edge 76 of the rod lip packing 720B for the balance chamber 70A and the outer circumferential surface RF of the rod 22A is smaller than a contact surface pressure PM (refer to FIG. 9) therebetween when a minimum-diameter inner circumferential edge PE is formed in an edge shape (refer to FIG. 8).

As illustrated in FIG. 6, when the piston lip packing 710B for the balance chamber 70A is mounted in a packing mounting groove formed in the piston 230, during the extension operation of the shock absorber 1A, the gas in the balance chamber 70A is compressed, and the fluid pressure is applied to a region between the outer circumferential lip 77 and the inner circumferential lip 75 of the piston lip packing 710B for the balance chamber 70A, the contact surface pressure between the maximum-diameter outer circumferential edge 78 of the piston lip packing 710B for the balance chamber 70A and the inner circumferential surface $210u$ of the cylinder 21A is smaller than the contact surface pressure therebetween when the maximum-diameter outer circumferential edge PD is formed in the edge shape (refer to FIG. 8).

Accordingly, friction during the compression operation and the extension operation of the shock absorber 1A is reduced, and the compression operation and the extension operation are smoothly performed.

In the rod lip packing 720B for the balance chamber 70A, and the piston lip packing 710B for the balance chamber 70A, an arc-shaped surface of a minimum-diameter inner circumferential edge 76 protrudes toward the center axis 13A. In the rod lip packing 720B for the balance chamber 70A, and the piston lip packing 710B for the balance chamber 70A, an arc-shaped surface of the maximum-diameter outer circumferential edge 78 protrudes in a direction away from the center axis 13A.

In the rod lip packing 720B for the balance chamber 70A, and the piston lip packing 710B for the balance chamber 70A, the arc-shaped surface of the minimum-diameter inner circumferential edge 76 and the arc-shaped surface of the maximum-diameter outer circumferential edge 78 is formed with a radial dimension (R dimension) of greater than 0.1 mm and less than 0.4 mm. Preferably, the radial dimension of the arc-shaped surfaces is in a range from 0.2 mm to 0.3 mm. When the arc-shaped surfaces are formed with the radial dimension of 0.2 mm to 0.3 mm, oil film retention between the minimum-diameter inner circumferential edge 76 and the outer circumferential surface RF of the rod 22A, and between the maximum-diameter outer circumferential edge 78 and the inner circumferential surface $210u$ of the cylinder 21A is improved, the friction during the compression operation and the extension operation is reduced, and the compression operation and the extension operation of the shock absorber 1A are smoothly performed.

If the arc-shaped surfaces have a radial dimension less than or equal to 0.1 mm, a difference between a start-up torque value and a dynamic frictional value during the compression operation and the extension operation of the shock absorber 1A is increased, and a load is increased when switching between the compression operation and the extension operation occurs. Therefore, oil film shortage between the minimum-diameter inner circumferential edge 76 and the outer circumferential surface RF of the rod 22A, and between the maximum-diameter outer circumferential edge 78 and the inner circumferential surface $210u$ of the cylinder 21A may occur, and dynamic friction is likely to be increased, which is not desirable. If the arc-shaped surfaces have a radial dimension greater than or equal to 0.4 mm, performance of sealing between the minimum-diameter inner circumferential edge 76 and the outer circumferential surface RF of the rod 22A, and between the maximum-diameter outer circumferential edge 78 and the inner circumferential surface $210u$ of the cylinder 21A may deteriorate, which is not desirable.

To return to the preferred embodiment, since the contact surface pressures between the minimum-diameter inner circumferential edge 76 of the rod lip packing 720B for the balance chamber 70A and the outer circumferential surface RF of the rod 22A, and between the maximum-diameter outer circumferential edge 78 of the piston lip packing 710B for the balance chamber 70A and the inner circumferential surface 210u of the cylinder 21A are reduced, it cannot be said that there is no possibility at all that slide lubricating oil in the balance chamber 70A moves from the balance chamber 70A to the outer chamber 60A, or from the balance chamber 70A to the inner chamber 50A. However, even if, by any possibility, the slide lubricating oil in the balance chamber 70A moves from the balance chamber 70A to the outer chamber 60A, or from the balance chamber 70A to the inner chamber 50A, since an amount of the slide lubricating oil sealed in the balance chamber 70A is small, the leaking slide lubricating oil may be unlikely to considerably affect pre-set reaction force characteristics of each of the gas spring chambers in the shock absorber 1A, and the reaction force characteristics of each of the gas spring chambers are stable.

If a lip packing having the edge shape (refer to FIG. 8) at the maximum-diameter outer circumferential edge 78 which is in contact with the circumferential surface of the packing mounting groove is used as the rod lip packing 720B for the balance chamber 70A, when the fluid pressure is applied to a region between the outer circumferential lip 77 and the inner circumferential lip 75, the contact surface pressure between the circumferential surface of the packing mounting groove and the maximum-diameter outer circumferential edge 78 is maximized. Therefore, gas and oil, which have a tendency of passing through the gap between the circumferential surface of the packing mounting groove and the maximum-diameter outer circumferential edge 78, are prevented from moving from the balance chamber 70A to the outer chamber 60A, and the reaction force characteristics of each of the gas spring chambers become more stable.

In addition, if a lip packing having the edge shape at the minimum-diameter inner circumferential edge 76 which is in contact with the circumferential surface of the packing mounting groove is used as the piston lip packing 710B for the balance chamber 70A, when the fluid pressure is applied to a region between the outer circumferential lip 77 and the inner circumferential lip 75, the contact surface pressure between the circumferential surface of the packing mounting groove and the minimum-diameter inner circumferential edge 76 is maximized. Therefore, the gas and the oil, which have a tendency of passing through a gap between the circumferential surface of the packing mounting groove and the minimum-diameter inner circumferential edge 76, are prevented from moving from the balance chamber 70A to the inner chamber 50A, and the reaction force characteristics of each of the gas spring chambers become more stable.

On the other hand, as a rod lip packing 720A for the outer chamber 60A which is a rod lip packing for the outer chamber other than the rod lip packing for the balance chamber 70A, and is mounted in such a way that the lips of the rod lip packing 720A for the outer chamber 60A faces the second end fixation portion 3A, a lip packing having the edge shape at a section of the minimum-diameter inner circumferential edge 76 of the inner circumferential lip 75 in contact with the outer circumferential surface RF of the rod 22A, and at a section of the maximum-diameter outer circumferential edge 78 of the outer circumferential lip 77 in contact with the circumferential surface of the packing mounting groove is used. In other words, a lip packing with a configuration illustrated in FIG. 8 is used as the rod lip packing 720A for the outer chamber 60A. Further, as a piston lip packing 710A for the inner chamber 50A which is a piston lip packing for the inner chamber 50A other than the piston lip packing for the balance chamber 70A, and is mounted in such a way that the lip of the piston lip packing 710A for the inner chamber 50A faces the second end fixation portion 3A, a lip packing having the edge shape at a section of the maximum-diameter outer circumferential edge 78 of the outer circumferential lip 77 in contact with the inner circumferential surface 210u of the cylinder 21A, and at a section of the minimum-diameter inner circumferential edge 76 of the inner circumferential lip 75 in contact with the circumferential surface of the packing mounting groove is used. In other words, a lip packing with the configuration illustrated in FIG. 8 is used as the piston lip packing 710A for the inner chamber 50A.

In this case, when the fluid pressure is applied to a region between the outer circumferential lip 77 and the inner circumferential lip 75 during the compression operation of the shock absorber 1A, the contact surface pressure between the minimum-diameter inner circumferential edge 76 of the rod lip packing 720A for the outer chamber 60A and the outer circumferential surface RF of the rod 22A is maximized, and a contact surface pressure between the maximum-diameter outer circumferential edge 78 and the circumferential surface of the packing mounting groove is maximized. In addition, a contact surface pressure between the maximum-diameter outer circumferential edge 78 of the piston lip packing 710A for the inner chamber 50A and the inner circumferential surface 210u of the cylinder 21A is maximized, and a contact surface pressure between the minimum-diameter inner circumferential edge 76 and the circumferential surface of the packing mounting groove is maximized. Accordingly, the gas and the oil are prevented from moving from the outer chamber 60A to the balance chamber 70A, and from the inner chamber 50A to the balance chamber 70A, and the pre-set reaction force characteristics of each of the gas spring chambers in the shock absorber 1A becomes stable.

In the gas spring shock absorber 1A according to Embodiment 2, it is possible to reduce the friction during the compression operation and the extension operation, it is possible to prevent the compression ratio adjustment oil from moving from the inner chamber 50A to the balance chamber 70A, and from the outer chamber 60A to the balance chamber 70A, and it is possible to stabilize the pre-set reaction force characteristics of each of the gas spring chambers. That is, it is possible to provide the gas spring shock absorber 1A in which both reducing the friction during the compression operation and the extension operation and stabilizing the reaction force characteristics of each of the gas spring chambers are achieved.

The shock absorber 1A in Embodiment 2 is used as at least one front fork leg of a right front fork leg and a left front fork leg which constitute a front fork of a motorcycle or the like. In a front fork which has the right front fork leg and the left front fork leg, and functions of which is divided between the right front fork leg and the left front fork leg, one of these two front fork legs is a damper leg with a damper, and the other of these two front fork legs is a spring leg with a spring, the shock absorber 1A may be used as a spring leg having a gas spring in replacement of a metal spring.

For example, since the first end fixation portion 2A is connected to an axle of the motorcycle, and the second end fixation portion 3A is connected to a frame or the like which configures a body of the motorcycle, the shock absorber 1A is configured as an upright cartridge (damper) front fork leg in which the rod 22A is positioned on an upper side and the cylinder 21A is positioned on a lower side.

Hereinafter, an overall configuration of the shock absorber 1A will be described in detail with reference to FIGS. 5 and 6. A seal member 130C is provided on the inner circumferential surface at the first end opening of the outer tube 11A. Multiple bushes 130A and 130B are provided on the inner circumferential surface of the outer tube 11A. Consequently, the outer circumferential surface of the inner tube 12A can slide on the inner circumferential surface of the outer tube 11A while air-tight sealing therebetween is maintained via the bushes 130A and 130B, and the seal member 130C.

A bush 370 is provided on an inner circumferential surface of the rod guide 360, and packing mounting grooves centered on the rod through hole 360h are respectively formed at a first end inner surface and a second end inner surface of the rod guide 360. The rod lip packing 720B for the balance chamber 70A is mounted in the packing mounting groove formed in the first end surface, and the rod lip packing 720A for the outer chamber 60A is mounted in the packing mounting groove formed in the second end surface.

An O-ring 312 is mounted in an O-ring mounting groove formed in an outer circumferential surface of the rod guide 360. The rod guide 360 and the inner tube 12A can move relative to each other in a state where air-tight sealing between the O-ring 312 and the inner circumferential surface of the inner tube 12A is formed. Since the O-ring 312 is in air-tight contact with the inner circumferential surface of the inner tube 12A, a sub-tank is formed by a gas chamber 700 that is formed between the outer circumferential surface of the cylinder 21A and the inner circumferential surface of the inner tube 12A, and communicates with the balance chamber 70A via a communication hole 362.

The rod guide 360 is provided at a second end of the cylinder 21A in such a way that a first end of a first end connection portion 361 of the rod guide 360 is connected to the second end opening of the cylinder 21A using screw fitting, and thus the cylinder 21A and the rod guide 360 move together. It is possible to change a volume of the gas chamber 700 by changing a length of the cylinder 21A. The communication hole 362 is formed in the first end connection portion 361.

The first end of the rod 22A passes through the rod through hole 360h of the rod guide 360, is inserted into the cylinder 21A, and passes through a spiral central hole of the rebound spring 40A, and then the piston 230 is attached to the first end of the rod 22A.

The first end of the rod 22A is inserted into a cylindrical rod insertion hole portion 230a which is formed in a connection portion and spring fixation portion 230A provided at the second end of the piston 230, and the rod insertion hole portion 230a is connected to the first end of the rod 22A using screw fitting.

An outer diameter of an outer circumferential surface of the rod insertion hole portion 230a is smaller than an inner diameter of the spiral central hole of the rebound spring 40A. The outer circumferential surface of the rod insertion hole portion 230a enters the spiral central hole via a first end opening of the spiral central hole. A first end of the rebound spring 40A is fixed to a spring fixation portion formed on the outer circumferential surface of the rod insertion hole portion 230a, a spring colliding surface is formed in a first end surface of the rod guide 360, and a second end of the rebound spring 40A collides with the spring colliding surface, and thus the rebound spring 40A prevents the shock absorber 1A from extending beyond a certain point.

Circular annular packing mounting grooves centered on the central axis 13A of the piston 230 are respectively provided at a first end and a second end of an outer circumferential surface of a circular columnar piston main body provided at a first end of the piston 230, and a circular annular piston ring mounting groove centered on the central axis 13A of the piston 230 is formed at a second end of the outer circumferential surface of the piston main body. The communication path 230B, through which the internal space of the rod 22A communicates with the balance chamber 70A, is formed in a connection portion with the piston main body in the connection portion and spring fixation portion 230A.

Slidability of the piston main body is improved due to contact between a piston ring 240 mounted in the piston ring mounting groove and the inner circumferential surface 210u of the cylinder 21A. As described above, the piston lip packing 710A for the inner chamber 50A is mounted in the packing mounting groove at the first end of the outer circumferential surface of the piston 230, and the piston lip packing 710B for the balance chamber 70A is mounted in the packing mounting groove at the second end of the outer circumferential surface of the piston 230.

Since the shock absorber 1A includes the sub-tank formed by the rod 22A that forms the gas chamber thereinside which communicates with the balance chamber 70A via the communication path 230B, and the sub-tank that forms the gas chamber 700 which communicates with the balance chamber 70A via the communication hole 362 formed in the first end connection portion 361 of the rod guide 360, it is possible to increase a volume of the balance chamber 70A, and to decrease the compression ratio even in high-pressure conditions. Accordingly, it is possible to stabilize the reaction force characteristics in a vicinity of an extension limit of the extension operation, and thus to improve operation stability.

Note that the gas chamber 700 is a sub-tank that is partitioned off by the first end fixation portion 2A, the rod guide 360, and the outer circumferential surface of the cylinder 21A and the inner circumferential surface of the inner tube 12A between the first end fixation portion 2A and the rod guide 360.

That is, since a space between the inner circumferential surface of the inner tube 12A and the outer circumferential surface of the cylinder 21A forms the gas chamber 700 for adjusting the compression ratio inside the balance chamber 70A, while the gas chamber 700 communicates with the balance chamber 70A, it is possible to increase the volume of the balance chamber 70A, and to decrease the compression ratio even in high-pressure conditions. Therefore, it is possible to stabilize the reaction force characteristics in the vicinity of the extension limit of the extension operation, and thus to improve the operation stability.

Figure 5:
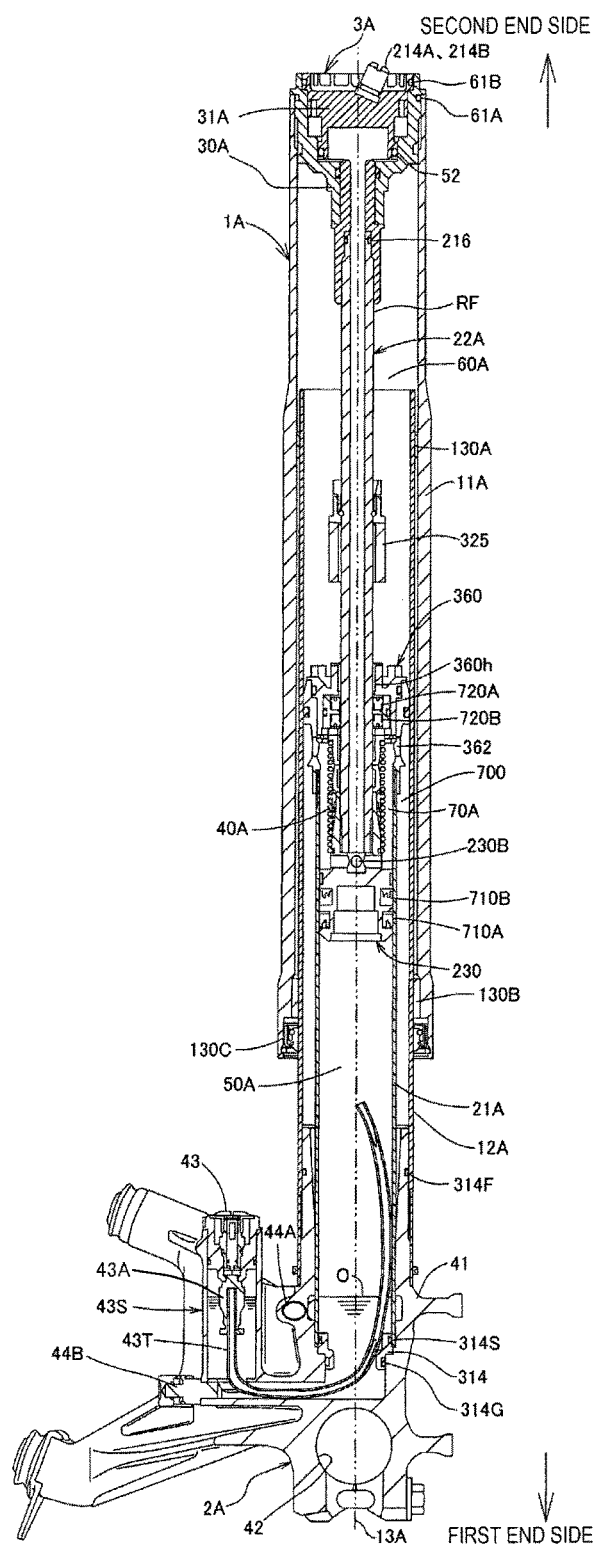
FIG. 5 is a sectional view illustrating an entire shock absorber (Embodiment 2).

As illustrated in FIG. 5, for example, the first end fixation portion 2A includes a first end fitting portion 41; an axle connection hole 42 to which the axle of the motorcycle is connected; a gas pressure adjustment unit 43; a quick coupler 44A; and a quick coupler 44B.

The first end fitting portion 41 is formed in a circular cylindrical shape with an outer diameter smaller than an inner diameter of a first end opening portion of the inner tube 12A, and with an inner diameter greater than an outer diameter of a first end opening portion of the cylinder 21A. The first end fitting portion 41 is fitted into the inner tube 12A via the first end opening of the inner tube 12A, and the first end opening portion of the cylinder 21A is inserted and fitted into the first end fitting portion 41. The first end fitting portion 41 is liquid-tightly screwed with the inner tube 12A with a seal member 314F interposed therebetween. A bottom piece 314 is disposed at the first end of the cylinder 21A, and the cylinder 21A is liquid-tightly fitted into the first end fitting portion 41 with the bottom piece 314 and seal members 314S and 314G (which are provided on the outer circumference of the bottom piece 314) interposed therebetween.

The gas pressure adjustment unit 43 communicates with the inner chamber 50A via a sub-tank 43S. Accordingly, by virtue of the gas pressure adjustment unit 43, it is possible to prevent gas from flowing to the outside from the internal space of the inner chamber 50A, and it is possible to adjust a pressure of gas sealed in the inner chamber 50A during adjustment.

The quick coupler 44A is an oil filler port through which the inner chamber 50A is filled with compression ratio adjustment oil, and the quick coupler 44B is an oil filler port through which the balance chamber 70A is filled with a small amount of oil for forming a sliding oil film. Accordingly, it is possible to adjust the volume of the inner chamber 50A, it is easy to adjust the compression ratio, and it is possible to adjust the amount of slide oil inside of the balance chamber 70A.

The inner chamber 50A communicates with the gas pressure adjustment unit 43 via a tube 43T. The tube 43T is supported by a tube supporting portion 43A, and it is possible to fill the inner chamber 50A with the gas via the tube 43T using the gas pressure adjustment unit 43. An end portion of the tube 43T is disposed to protrude further toward the vehicle body than a liquid surface of oil O inside of the inner chamber 50A. For this reason, it is possible to prevent the oil from being discharged via the gas pressure adjustment unit 43 even if the gas pressure inside the inner chamber 50A is adjusted (reduced).

The second end fixation portion 3A includes a second end portion of the outer tube 11A, and a bolt portion 30A and a cap 31A which air-tightly block the second end openings of the outer tube 11A and the rod 22A. The bolt portion 30A is connected to the second end opening of the outer tube 11A using screw fitting, and the bolt portion 30A is connected to the second end opening of the rod 21A using screw fitting. The cap 31A includes a gas pressure adjustment unit 214A for adjusting a pressure of gas sealed in the gas chamber inside of the rod 22A, and an outer chamber gas pressure adjustment unit 214B for adjusting a pressure of gas sealed in the outer chamber 60A. The second end portion of the outer tube 11A, which is blocked with the cap 31A and the bolt portion 30A, is connected to the frame or the like which configures the body of the motorcycle. In the second end fixation portion 3A, air-tight sealing between the inside of the outer tube 11A and the outside, and between the inside of the cylinder 21A and the outside is maintained due to seal members 52, 61A, 61B, 216, and the like such as O-rings.

A rubber bumper 325 is fixed to a central portion of the outer circumferential surface RF of the rod 22A. The rubber bumper 325 reduces an impact when the inner tube 12A hits the bolt portion 30A during the compression operation of the shock absorber 1A by that the second end of the inner tube 12A comes into metal-to-metal contact with the bolt portion 30A after the rubber bumper 325 is bent by approximately 4 mm.

The upright cartridge (damper) shock absorber 1A described in Embodiment 2 may be configured not to include the sub-tank 43S and the sub-tank which forms the gas chamber 700.

What is claimed is:
1. A shock absorber comprising:
a cylindrical inner tube having a first end and a second end;
a first end fixation portion to which the first end of the inner tube is fixed in such a way that a first end opening of the inner tube is sealed;
a cylindrical outer tube having a first end and a second end where the second end of the inner tube is inserted into the outer tube via a first end opening of the outer tube, and the inner tube and the outer tube can move relative to each other in a state where an air-tight sealing condition between an outer circumferential surface of the inner tube and an inner circumferential surface of the outer tube is formed;
a second end fixation portion to which the second end of the outer tube is fixed in such a way that a second end opening of the outer tube is sealed;
a rod disposed inside of the outer tube and the inner tube where one of a first end and a second end of the rod is fixed to the first end fixation portion or the second end fixation portion in such a way that one of a first end opening and a second end opening of the rod is sealed;
a cylinder disposed inside of the outer tube and the inner tube where one of a first end and a second end of the cylinder is fixed to the second end fixation portion or the first end fixation portion in such a way that one of a first end opening and a second end opening of the cylinder is sealed;
a rod guide provided on the other of the first end opening and the second end opening of the cylinder where the other of the first end and the second end of the rod is inserted into the cylinder via a rod-through hole of the rod guide; and
a piston provided on the other of the first end and the second end of the rod which is inserted into the cylinder,
wherein when the first end fixation portion and the second end fixation portion move in such a way as to approach each other, or as to move away from each other, the piston and the rod guide can move in such a way as to as to move away from each other, or as to approach each other in a state where an air-tight sealing condition between an outer circumferential surface of the piston, provided on the rod, and an inner circumferential surface of the cylinder is maintained, and air-tight sealing condition between an outer circumferential surface of the rod and an inner circumferential surface of the rod through hole of the rod guide is maintained,
a first gas spring chamber, a second gas spring chamber and a third gas spring chamber are formed inside of the outer tube and the inner tube,
the first gas spring chamber forms a space inside of the cylinder and between the piston and the first end fixation portion or the second end fixation portion which fixes the first end or the second end of the cylinder,
the second gas spring chamber forms a space outside of the rod and inside of at least one of the inner tube and the outer tube,
the third gas spring chamber forms a space inside of the cylinder and between the piston and the rod guide,
an inside of the rod communicates with the third gas spring chamber while working as a gas chamber for adjusting an internal compression ratio of the third gas spring chamber, in a compression operation in which the first end fixation portion and the second end fixation portion move in such a way as to approach each other, volumes of the first gas spring chamber and the second gas spring chamber are reduced, and gas in the first gas spring chamber and the second gas spring chamber is compressed to form a gas spring generating a reaction force that biases the first end fixation portion and the second end fixation portion to move away from each other, in an extension operation in which the first end fixation portion and the second end fixation portion move in such a way as to move away from each other, since the piston and the guide rod move in such a way as to approach each other, a volume of the third gas spring chamber is reduced, and gas in the third gas spring chamber is compressed to form a gas spring generating a reaction force that biases the first end fixation portion and the second end fixation portion to approach each other, and the shock absorber further comprises:
- a first lip packing which works as a rod lip packing for the third gas spring chamber so that gas and oil in the third gas spring chamber can be prevented from leaking to the second gas spring chamber when being compressed during the extension operation where the first lip packing has a lip, and a surface of the lip in contact with the outer circumferential surface of the rod is formed in an arc shape;
- a second lip packing which works as a piston lip packing for the third gas spring chamber so that the gas and the oil in the third gas spring chamber can be prevented from leaking to the first gas spring chamber when being compressed during the extension operation where the second lip packing has a lip, and a surface of the lip of the second lip packing in contact with the inner circumferential surface of the cylinder is formed in an arc shape;
- a third lip packing which works as a piston lip packing for the first gas spring chamber so that the gas and the oil in the first gas spring chamber can be prevented from leaking to the third gas spring chamber when being compressed during the compression operation where the third lip packing has a lip, and a surface of the lip of the third lip packing in contact with the inner circumferential surface of the cylinder is formed in an edge shape; and
- a fourth lip packing which works as a rod lip packing for the second gas spring chamber so that the gas and the oil in the second gas spring chamber can be prevented from leaking to the third gas spring chamber when being compressed during the compression operation where the fourth lip packing has a lip, and a surface of the lip of the fourth lip packing in contact with the outer circumferential surface of the rod is formed in an edge shape.

2. The shock absorber according to claim 1, wherein an arc-shaped surface of the lip of each of the first lip packing and the second lip packing has a radial dimension of greater than 0.1 mm and less than 0.4 mm.

3. The shock absorber according to claim 1, wherein the first end of the inner tube and the first end of the rod are fixed to the first end fixation portion, and the second end of the outer tube and the second end of the cylinder are fixed to the second end fixation portion.

4. The shock absorber according to claim 2, wherein the first end of the inner tube and the first end of the rod are fixed to the first end fixation portion, and the second end of the outer tube and the second end of the cylinder are fixed to the second end fixation portion.

5. The shock absorber according to claim 3, wherein a fourth gas chamber for adjusting the internal compression ratio of the third gas spring chamber is provided inside of the cylinder so as to communicate with the third gas spring chamber via a communication path formed in the piston.

6. The shock absorber according to claim 4, wherein a fourth gas chamber for adjusting the internal compression ratio of the third gas spring chamber is provided inside of the cylinder so as to communicate with the third gas spring chamber via a communication path formed in the piston.

7. The shock absorber according to claim 3, wherein a fourth gas chamber for adjusting the internal compression ratio of the third gas spring chamber is provided so as to communicate with the inside of the rod and the third gas spring chamber via the second end opening of the rod fixed to the first end fixation portion.

8. The shock absorber according to claim 4, wherein a fourth gas chamber for adjusting the internal compression ratio of the third gas spring chamber is provided so as to communicate with the inside of the rod and the third gas spring chamber via the second end opening of the rod fixed to the first end fixation portion.

9. The shock absorber according to claim 5, wherein a fourth gas chamber for adjusting the internal compression ratio of the third gas spring chamber is provided so as to communicate with the inside of the rod and the third gas spring chamber via the second end opening of the rod fixed to the first end fixation portion.

10. The shock absorber according to claim 6, wherein a fourth gas chamber for adjusting the internal compression ratio of the third gas spring chamber is provided so as to communicate with the inside of the rod and the third gas spring chamber via the second end opening of the rod fixed to the first end fixation portion.

11. The shock absorber according to claim 1, wherein the first end of the inner tube and the first end of the cylinder are fixed to the first end fixation portion, and the second end of the outer tube and the second end of the rod are fixed to the second end fixation portion.

12. The shock absorber according to claim 2, wherein the first end of the inner tube and the first end of the cylinder are fixed to the first end fixation portion, and the second end of the outer tube and the second end of the rod are fixed to the second end fixation portion.

13. The shock absorber according to claim 11, wherein a space between an inner circumferential surface of the inner tube and an outer circumferential surface of the cylinder forms a fourth gas chamber for adjusting the internal compression ratio of the third gas spring chamber, which communicates with the third gas spring chamber.

14. The shock absorber according to claim 12, wherein a space between an inner circumferential surface of the inner tube and an outer circumferential surface of the cylinder forms a fourth gas chamber for adjusting the internal compression ratio of the third gas spring chamber, which communicates with the third gas spring chamber.

15. The shock absorber according to claim 1, wherein the first end fixation portion is connected to an axle of a motorcycle, and the second end fixation portion is connected to a vehicle body of the motorcycle.

* * * * *